(12) United States Patent
Nishikawa et al.

(10) Patent No.: US 7,903,202 B2
(45) Date of Patent: Mar. 8, 2011

(54) LIQUID CRYSTAL DISPLAY DEVICE

(75) Inventors: Masaki Nishikawa, Chiba (JP); Yuko Matsumoto, Onjuku (JP)

(73) Assignees: Hitachi Displays, Ltd., Chiba (JP); Hitachi Display Devices, Ltd., Chiba (JP)

( * ) Notice: Subject to any disclaimer, the term of this patent is extended or adjusted under 35 U.S.C. 154(b) by 178 days.

(21) Appl. No.: 12/277,534

(22) Filed: Nov. 25, 2008

(65) Prior Publication Data

US 2009/0135340 A1    May 28, 2009

(30) Foreign Application Priority Data

Nov. 28, 2007    (JP) ................................. 2007-306880

(51) Int. Cl.
*G02F 1/1335*    (2006.01)
(52) U.S. Cl. ......................................................... 349/70
(58) Field of Classification Search ........................ None
See application file for complete search history.

(56) References Cited

U.S. PATENT DOCUMENTS

2009/0096958 A1 *    4/2009    Matsuura et al. ............... 349/70

FOREIGN PATENT DOCUMENTS

| JP | 2003-323865 | 11/2003 |
| JP | 2006-024548 | 1/2006 |

* cited by examiner

*Primary Examiner* — Sung H Pak
(74) *Attorney, Agent, or Firm* — Antonelli, Terry, Stout & Kraus, LLP.

(57) ABSTRACT

To provide a liquid crystal display device that includes a cold cathode fluorescent lamp that controls a drop in the luminous efficacy of a fluorescent substance layer in a large electrical current region. Uneven portions UNE are formed in a surface of a fluorescent substance film FLU that is formed on an inner wall surface of a glass tube VAL that configures a cold cathode fluorescent lamp CCFL, whereby the surface area of the film surface can be increased and a drop in the fluorescent substance luminous efficacy in a large current region can be controlled, so the effect of improving the luminance of a display screen over a long period of time is obtained as a backlight of a liquid crystal display panel LCD.

11 Claims, 8 Drawing Sheets

LIQUID CRYSTAL DISPLAY DEVICE

BACKGROUND OF THE INVENTION

1. Field of the Invention

The present invention pertains to a liquid crystal display device that uses a cold cathode fluorescent lamp as a light source and in particular relates to the surface of a fluorescent substance film that is formed on an inner wall surface of the cold cathode fluorescent lamp.

2. Description of the Related Art

In image display apparatus that use a liquid crystal display panel that is a non-emitting type, an electronic latent image that has been formed on the liquid crystal display panel is visualized by disposing external illuminating means. In the external illuminating means, an illuminating device is installed on the back surface or the front surface of the liquid crystal display panel with the exception of a structure that utilizes natural light. Particularly in a display device that requires high luminance, a structure where the illuminating device is disposed on the back surface of the liquid crystal display panel is becoming mainstream. This is called a backlight.

Broadly speaking, there are side edge type backlights and direct type backlights. Side edge type backlights have a structure where a linear light source represented by a cold cathode fluorescent lamp is installed along a side edge portion of a light guide plate that comprises a transparent plate, and side edge type backlights are heavily used in display devices that must be made thin for personal computers and the like. On the other hand, in large-size liquid crystal display devices such as display devices that are used in display monitors and television receivers, direct type backlights are heavily used. Direct type backlights have a structure where the illuminating device is installed directly under the back surface side of the liquid crystal display panel.

A typical cold cathode fluorescent lamp that is used in this type of illuminating device is configured such that a pair of cathodes are installed in both end portions of a transparent glass tube, a fluorescent substance film is adhered to and formed on the inner peripheral surface of the glass tube, and mercury and a noble gas are enclosed inside that glass tube. Additionally, a high voltage is applied between the pair of opposing cathodes that are hermetically sealed in both end portions inside of this glass tube to cause the cathodes to discharge, whereby ultra violet rays with a wavelength of about 254 nm resulting from excitation radiation of the mercury are generated, and the fluorescent substance is excited by those ultra violet rays and visible light is radiated, whereby a luminous flux is obtained.

It is known that, usually the lumen maintenance factor of a cold cathode fluorescent lamp gradually drops because of lighting over a long period of time, and this tendency becomes even larger by increasing the electric current that flows in the cold cathode fluorescent lamp in order to improve luminance. However, from the standpoints in recent years of improving the screen luminance and lowering the costs of liquid crystal displays, increasing the luminous flux radiated from one cold cathode fluorescent lamp is much needed.

As a cold cathode fluorescent lamp that solves this problem, in JP-A-2006-24548, there is disclosed a cold cathode fluorescent lamp where the cross-sectional shape of a discharge space in a glass tube is set to a long diameter and a short diameter such that the cross-sectional shape of the discharge space is defined in a slender flat shape or an elliptical shape, whereby a planar portion is disposed on an installation side of the cold cathode fluorescent lamp, so that the cold cathode fluorescent lamp can be easily fixed and it is ensured that the installation direction can be unified, and where a light discharge surface resulting from the elliptical portion is disposed so as to face a light incident surface side of a backlight device, whereby light diffuses and luminance non-uniformity can be reduced, and the luminance can be raised.

Further, in JP-A-2003-323865, there is disclosed a cold cathode fluorescent lamp where the inner surface of a glass tube is covered by a protective layer comprising a metal oxide, this protective layer is covered by a fluorescent substance layer whose film thickness is less than 20 μm, and the glass tube is formed by a glass material that includes an excitation component which, when ultra violet light resulting from excitation is received by its light emitting substance, excitation-radiates ultra violet light whose wavelength is longer than that of this ultra violet light, whereby the utilization efficiency with which ultra violet rays resulting from excitation of mercury are utilized for the luminous flux is improved.

SUMMARY OF THE INVENTION

However, cold cathode fluorescent lamps that are configured in this manner have had the problem that, in either configuration, even when the amount of the electric current that flows in one cold cathode fluorescent lamp is increased, a drop in the fluorescent substance luminous efficacy that accompanies this increase in the electric current amount cannot be controlled.

Consequently, the present invention has been made in order to solve the aforementioned conventional problem, and it is an object thereof to provide a liquid crystal display device that includes a cold cathode fluorescent lamp that includes a film surface structure of a fluorescent substance film that can control a drop in the luminous efficacy of a fluorescent substance even when the electric current that flows in one cold cathode fluorescent lamp is increased.

In order to achieve this object, a liquid crystal display device according to the present invention comprises: a liquid crystal display panel that is configured by sandwiching a liquid crystal layer between a pair of transparent substrates that include electrodes for pixel formation on their inner surfaces; a backlight that includes at least one cold cathode fluorescent lamp that irradiates this liquid crystal display panel with illuminating light; an optical compensation stack that is inserted between the liquid crystal display panel and the backlight; and a frame that houses the liquid crystal display panel and the backlight, wherein the cold cathode fluorescent lamp includes a transparent glass tube inside of which a noble gas and mercury are encapsulated, a pair of opposing cold cathodes that are enclosed and disposed in both end portions of the glass tube, a pair of electrical power lead-in wires, one end of each of which is connected to the cold cathodes and the other end of each of which is hermetically sealed outside the glass tube and is led outside the glass tube, and a fluorescent substance film that is formed on an inner wall surface of the glass tube, and this fluorescent substance film includes uneven portions in its film surface. Because of this configuration, the surface area of the fluorescent substance film increases, so intensity with respect to per fluorescent substance unit area of mercury-derived ultra violet rays that are an excitation source of the fluorescent substance is reduced and a drop in the fluorescent substance luminous efficacy is controlled, so the problem in the background art is solved.

Further, another liquid crystal display device according to the present invention is preferably characterized in that, in the above-described configuration, the uneven portions in the fluorescent substance film are uneven portions including concave portions and convex portions which do not result from the shape of fluorescent substance particles and particle diameter differences between the fluorescent substance particles.

Further, another liquid crystal display device according to the present invention is preferably characterized in that, in the above-described configuration, the uneven portions in the fluorescent substance film are formed periodically or a periodically along a circumferential direction of the inner wall surface of the glass tube.

Further, another liquid crystal display device according to the present invention is preferably characterized in that, in the above-described configuration, the uneven portions in the fluorescent substance film are formed periodically or a periodically along a tube axis direction of the inner wall surface of the glass tube.

Further, another liquid crystal display device according to the present invention is preferably characterized in that, in the above-described configuration, the film thickness of the convex portions in the fluorescent substance film is equal to or greater than 1.5 times the film thickness of the concave portions.

Further, another liquid crystal display device according to the present invention comprises: a liquid crystal display panel that is configured by sandwiching a liquid crystal layer between a pair of transparent substrates that include electrodes for pixel formation on their inner surfaces; a backlight that includes at least one cold cathode fluorescent lamp that irradiates this liquid crystal display panel with illuminating light; an optical compensation stack that is inserted between the liquid crystal display panel and the backlight; and a frame that houses the liquid crystal display panel and the backlight, wherein the cold cathode fluorescent lamp includes a transparent glass tube inside of which a noble gas and mercury are encapsulated, a pair of opposing cold cathodes that are enclosed and disposed in both end portions of the glass tube, a pair of electrical power lead-in wires, one end of each of which is connected to the cold cathodes and the other end of each of which is hermetically sealed outside the glass tube and is led outside the glass tube, and a fluorescent substance film that is formed on an inner wall surface of the glass tube, the glass tube includes uneven portions in its inner wall surface, and the fluorescent substance film that is formed on the uneven portions includes periodic or a periodic uneven portions resulting from the uneven portions in the inner wall surface of the glass tube. Because of this configuration, the surface area of the fluorescent substance film increases, so intensity with respect to per fluorescent substance unit area of mercury-derived ultra violet rays that are an excitation source of the fluorescent substance is reduced and a drop in the fluorescent substance luminous efficacy is controlled, so the problem in the background art is solved.

Further, another liquid crystal display device according to the present invention is preferably characterized in that, in the above-described configuration, the uneven portions in the inner wall surface of the glass tube are formed along a circumferential direction of the glass tube.

Further, another liquid crystal display device according to the present invention is preferably characterized in that, in the above-described configuration, the uneven portions in the inner wall surface of the glass tube are formed along a tube axis direction of the glass tube.

Further, another liquid crystal display device according to the present invention is preferably characterized in that, in the above-described configuration, a film thickness difference between the convex portions and the concave portions in the inner wall surface of the glass tube is equal to or greater than 9 µm.

Further, another liquid crystal display device according to the present invention is preferably characterized in that, in the above-described configuration, a difference between the convex portions and the concave portions in the inner wall surface of the glass tube is equal to or greater than 10 µm.

It will be noted that the present invention is not limited to the above-described configurations and that various changes are possible without departing from the technical thought of the present invention.

According to the present invention, the uneven portions are formed in the fluorescent substance film that is formed on the inner wall surface of the transparent glass tube, whereby the surface area thereof is increased, a drop in the fluorescent substance luminous efficacy in a large electrical current region is controlled, the luminous flux amount from the cold cathode fluorescent lamp efficiently increases, and screen luminance can be improved over a long period of time as a backlight of a liquid crystal display panel, so there is obtained the extremely excellent effect that a liquid crystal display device with high quality and high reliability is realizable.

DETAILED DESCRIPTION OF THE EMBODIMENTS

Below, specific embodiments of the present invention will be described in detail with reference to drawings of the embodiments.

Figure 1:
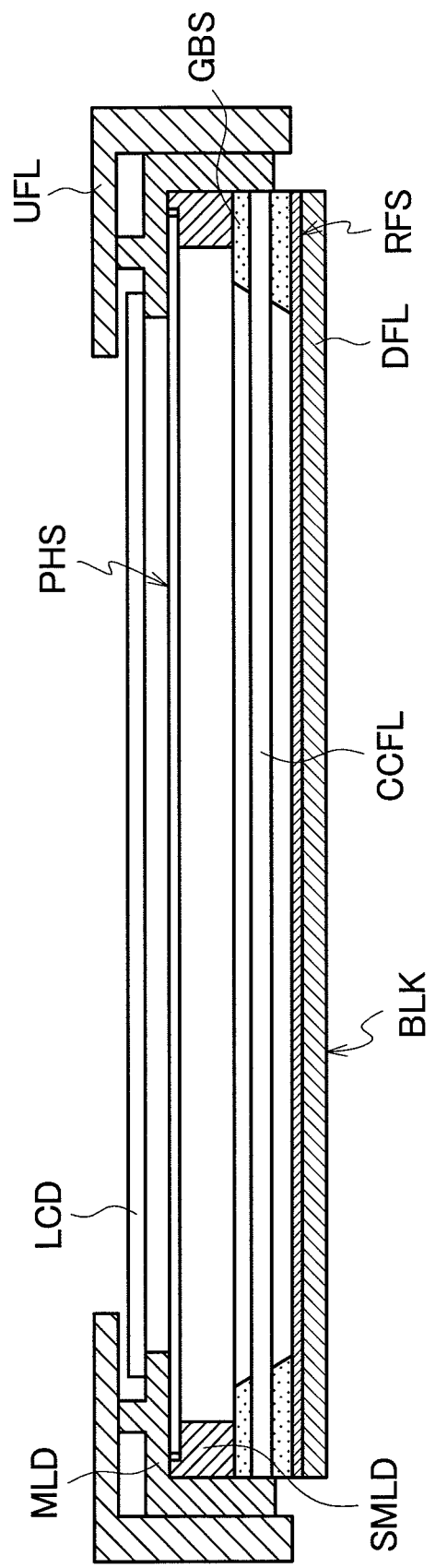
FIG. 1 is a cross-sectional diagram of relevant portions describing a configural example of embodiment 1 of a liquid crystal display device according to the present invention.
Figure 2:
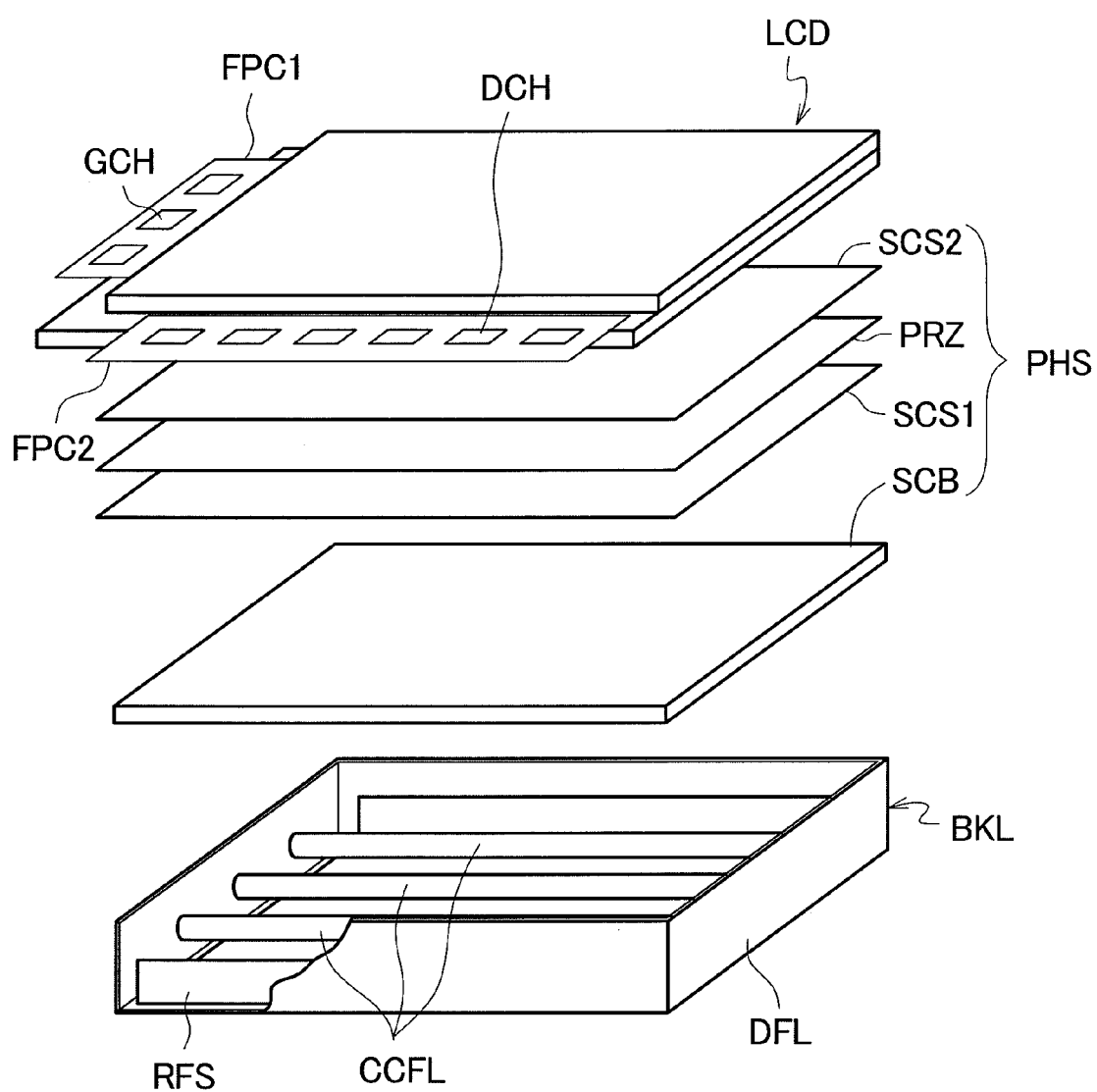
FIG. 2 is a developed perspective diagram of the liquid crystal display device shown in FIG. 1.

FIG. 1 is a schematic cross-sectional diagram of relevant portions for describing the configuration of an embodiment of a liquid crystal display device according to the present invention, and FIG. 2 is a schematic developed perspective diagram of relevant portions of FIG. 1.

In FIG. 1 and FIG. 2, in a liquid crystal display panel LCD, a liquid crystal layer is sealed between two transparent glass substrates that include electrodes (not shown) for pixel formation. Two sides of one of the glass substrates (ordinarily, also called an active matrix substrate) protrude from the other substrate (ordinarily, also called a color filter substrate).

On this protruding portion, there are mounted a flexible printed circuit substrate FPC1 on which scan signal line drive circuit chips GCH are installed and a flexible printed circuit substrate FPC2 on which data signal line drive circuit chips DCH are installed.

In this liquid crystal display device, a reflection sheet RFS is laid on the inside of a lower frame DFL, and plural cold cathode fluorescent lamps CCFL are installed in parallel above the reflection sheet RFS, whereby a backlight BKL is configured. The configuration of the cold cathode fluorescent lamps CCFL in this backlight BKL will be described in detail later. The lower frame DFL is formed by a metal plate compact and has the function of superposing and integrating the liquid crystal display panel LCD together with an optical compensation sheet stack PHS between the lower frame DFL and an upper frame UFL that is similarly formed by a metal plate. Here, in FIG. 2, illustration of the upper frame UFL is omitted.

In accompaniment with the size of the liquid crystal display panel LCD becoming large, usually the tube axis direction length of the cold cathode fluorescent lamps CCFL becomes large. The cold cathode fluorescent lamps CCFL are fluorescent lamps that are configured by glass tubes with a small diameter, and ordinarily the cold cathode fluorescent lamps CCFL are installed such that both end portions thereof are supported by rubber bushes GBS.

Moreover, in a liquid crystal display device that uses a direct type backlight as an illuminating device as illustrated, plural types of the optical compensation sheet stack PHS are installed in the upper portion of the backlight BKL (between the backlight BKL and the liquid crystal display panel LCD). This optical compensation sheet stack PHS is configured as a result of a diffusion plate SCB, a first diffusion sheet SCS1, two prism sheets PRZ that are arranged so as to intersect, and a second diffusion sheet SCS2 being superposed.

The aforementioned direct type backlight BKL includes a resin-made side portion holding frame SMLD called a side mold that is disposed on a side edge of the lower frame DFL that is bottomed and includes a side edge, and the direct type backlight BKL is held by causing the peripheral end of the optical compensation sheet stack PHS to bridge this side portion holding frame SMLD.

Further, the backlight BKL in which a light guide plate GLB and the optical compensation sheet PHS are held as illustrated is covered by the upper frame UFL after being combined with the liquid crystal display panel LCD by a mold frame MLD, and the upper frame UFL and the lower frame DFL are coupled together by an unillustrated locking member and integrated, whereby the liquid crystal display device is configured. Here, in a configuration where the liquid crystal display panel LCD is to be made large, it is also possible to use a light diffusion plate or a light diffusion sheet.

Figure 3:
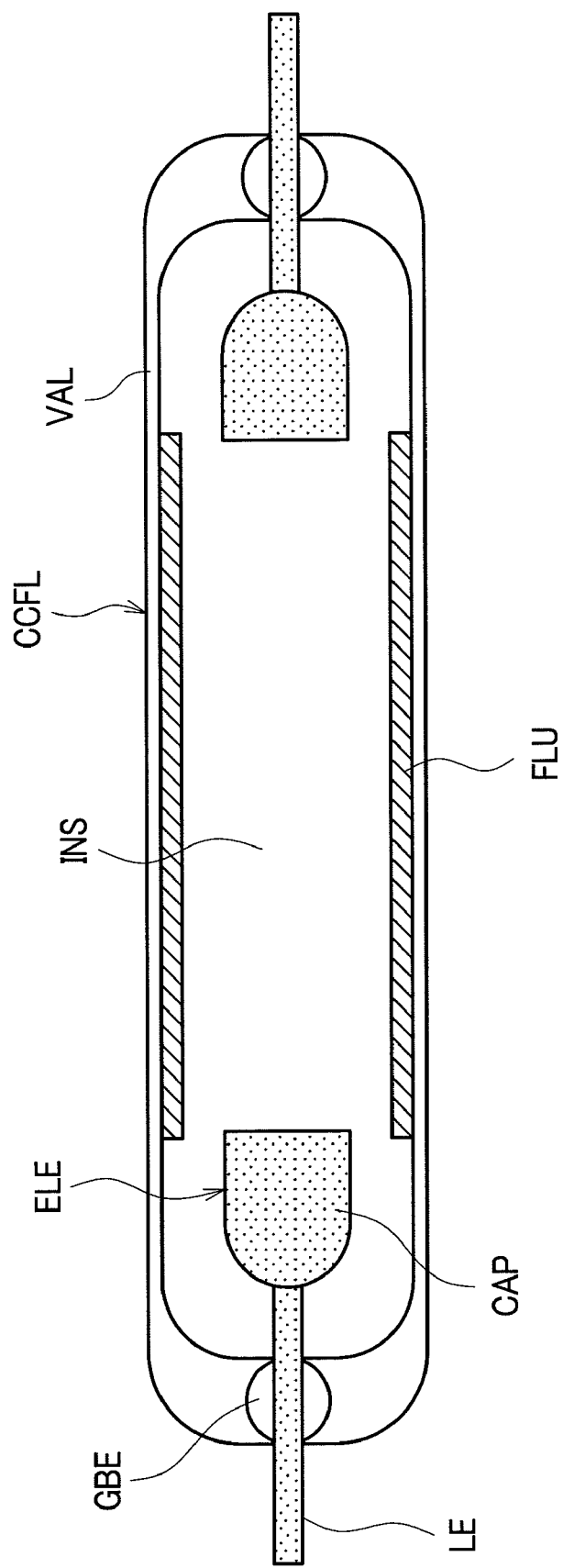
FIG. 3 is an enlarged cross-sectional diagram of relevant portions showing the configuration of embodiment 1 of a cold cathode fluorescent lamp that is packaged in the liquid crystal display device shown in FIG. 1 and FIG. 2.
Figure 4:
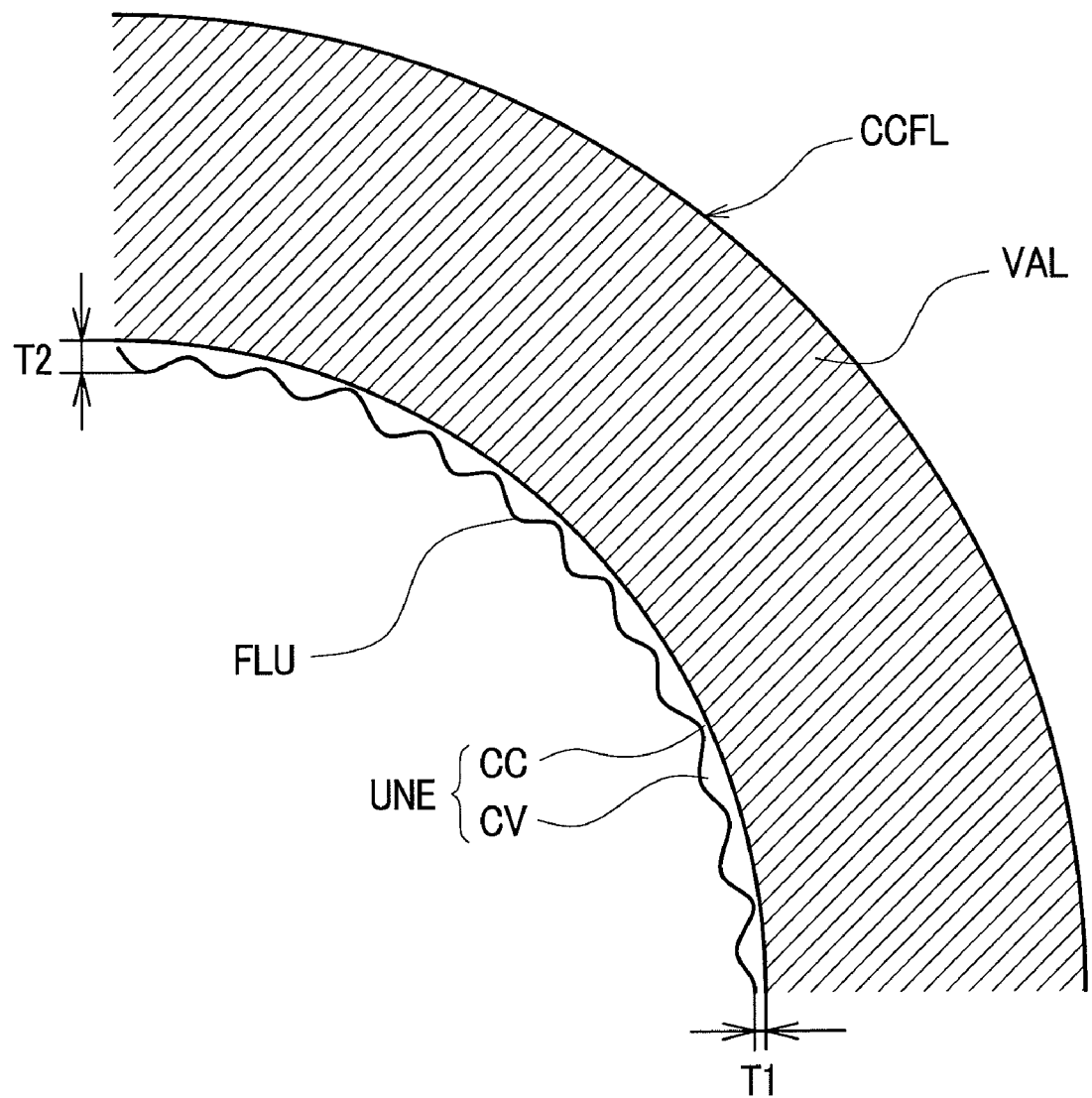
FIG. 4 is an enlarged cross-sectional diagram of relevant portions where the cold cathode fluorescent lamp shown in FIG. 3 is cut in a plane perpendicular to a tube axis.

FIG. 3 is an enlarged cross-sectional diagram of relevant portions showing the configuration of embodiment 1 of the cold cathode fluorescent lamp CCFL that is packaged in the liquid crystal display device according to the present invention, and FIG. 4 is an enlarged cross-sectional diagram of relevant portions where the cold cathode fluorescent lamp CCFL shown in FIG. 3 is cut in a plane perpendicular to the tube axis. In FIG. 3, in this cold cathode fluorescent lamp CCFL, a fluorescent substance film FLU in whose surface are formed fine uneven portions is adhered to and formed on an inner wall surface of a transparent glass tube VAL. The configuration of this fluorescent substance film FLU will be described in detail later.

Further, a pair of cold cathodes ELE are disposed opposing each other inside both end sides of this transparent glass tube VAL, and neon-argon (Ne—Ar) gas as inert gas and mercury are enclosed in a discharge space INS in the glass tube VAL after being vacuumed.

Further, the pair of cold electrodes ELE are formed by causing open ends of inside electrodes CAP, where, for example, nickel material or molybdenum material or the like has been molded into cap shapes by, for example, press molding, to face a main discharge region and causing electrical power lead-in wires LE that comprise, for example, a nickel-cobalt-iron alloy that approximates the coefficient of thermal expansion of the glass tube VAL to match up with the rear end bottom portions of the inside electrodes CAP such that they are joined together and electrically connected by, for example, resistance welding or laser welding or the like. These electrical power lead-in wires LE are supported and hermetically sealed in glass beads GBE on both end portions of the glass tube VAL, and the pair of cold electrodes ELE are hermetically sealed in both end portions of the glass tube VAL such that the open ends of the pair of cold electrodes ELE face the main discharge region.

The cold cathode fluorescent tube CCFL configured in this manner is connected to an unillustrated power supply circuit (usually an inverter lighting circuit) to the pair of electrical power lead-in wires LE, and lighting electrical power is supplied between the pair of opposing cold electrodes ELE.

As for this cold cathode fluorescent lamp CCFL, a fluorescent substance suspension, whose main components were a rare earth fluorescent substance with a particle diameter of about 5 μm, for example, a vehicle, a diluent and a binder, was applied by, for example, suction to the inner wall surface of the transparent glass tube VAL comprising borosilicate glass with an inner diameter of about 2.0 mm and an outer diameter of about 3.0 mm, dried, and thereafter baking was performed at a temperature equal to or greater than about 500° C., and the fluorescent substance film FLU was formed. In this case, the component fraction of the fluorescent substance suspension and the surrounding temperature and humidity are set to appropriate conditions, whereby, as shown in FIG. 4, there is formed the fluorescent substance film FLU whose film thickness is not homogenous along the circumferential direction of the inner wall surface of the glass tube VAL but in whose surface was formed uneven portions UNE where fine concave portions CC and convex portions CV were a periodically continuous. It will be noted that, at this time, this fluorescent substance film FLU was formed such that a film thickness T1 of the concave portions CC that become the thinnest portions becomes equal to or greater than about 18 μm.

The glass tube VAL on which the fluorescent substance film FLU was formed in this manner was cut as shown in FIG. 4, and the fluorescent substance film FLU that was formed on the inner wall surface of the glass tube VAL was observed with a microscope. As a result, the film thickness T1 of the concave portions (thinnest portions) CC of the uneven portions UNE was about 18 μm and a film thickness T2 of the convex portions (thickest portions) CV was about 27 μm. In the present embodiment, this uneven surface UNE had an a periodic shape because the uneven portions UNE were formed in the fluorescent substance film FLU by a simple and convenient method.

Figure 5:
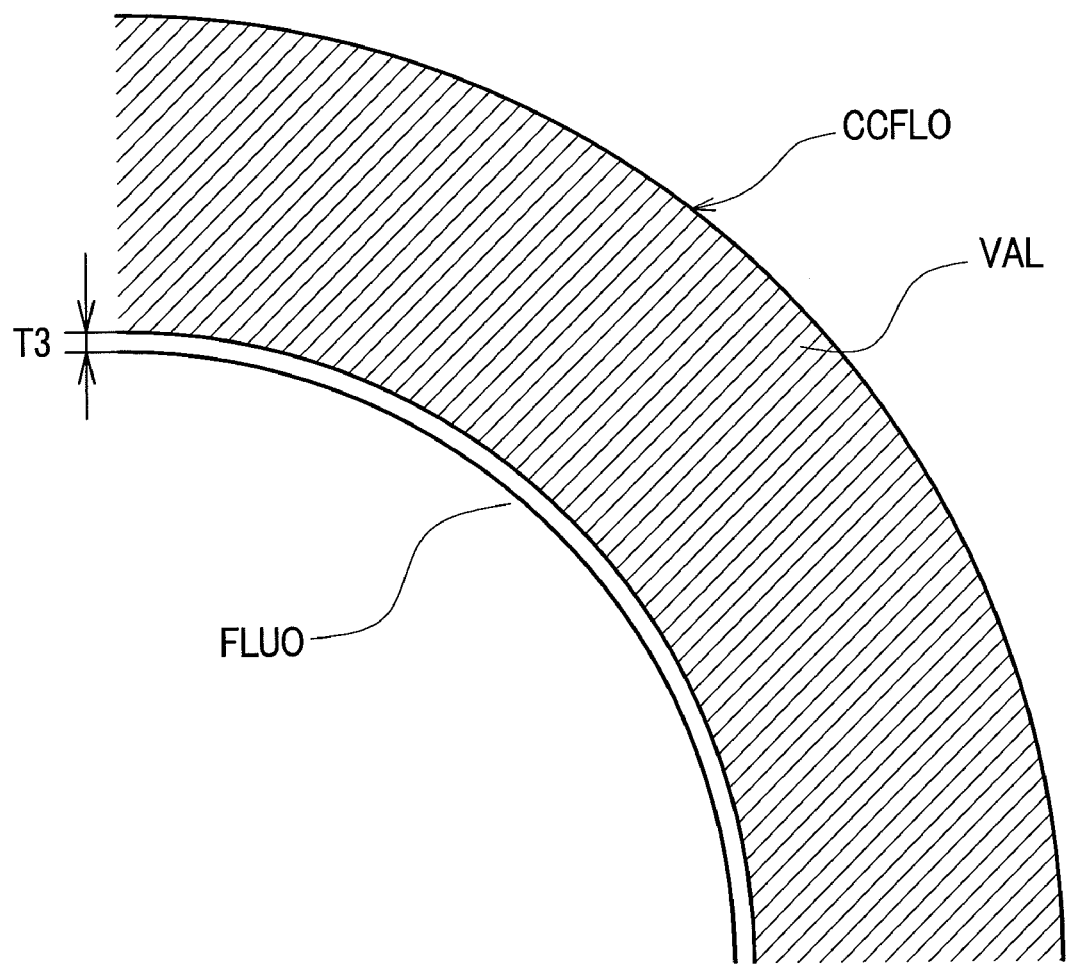
FIG. 5 is an enlarged cross-sectional diagram of relevant portions where a conventional cold cathode fluorescent lamp is cut in a plane perpendicular to a tube axis.
Figure 6:
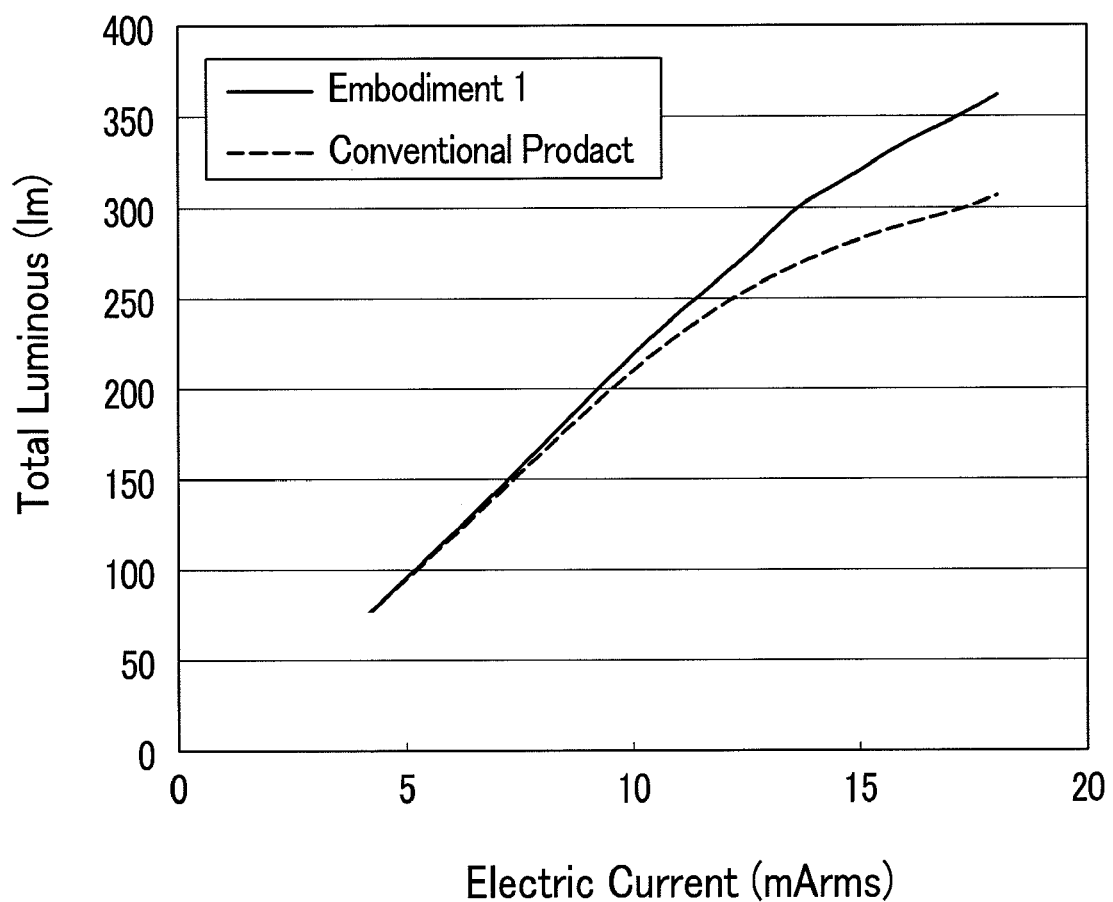
FIG. 6 is a diagram showing electric current dependences of total luminous fluxes of the cold cathode fluorescent lamp of embodiment 1 and the conventional cold cathode fluorescent lamp.

The cold cathode fluorescent lamp CCFL was manufactured using the glass tube VAL on whose inner wall surface was formed the fluorescent substance film FLU in which there were these uneven portions UNE. Further, for a comparison corresponding to a conventional structure, as shown in the enlarged cross-sectional diagram showing relevant portions cut in a plane perpendicular to the tube axis in FIG. 5, a cold cathode fluorescent lamp CCFLO including a homogenous fluorescent substance film FLUO whose film thickness T3 is about 20±1 μm was manufactured. Next, the total luminous fluxes of these cold cathode fluorescent lamps were measured using an integrating sphere. It will be noted that an integrating sphere is a spherical device that is used in order to measure the diffuse reflection spectrum (diffuse reflectance spectroscopy) of an infrared region from vacuum ultra violet. Those measurement results are shown in FIG. 6. In the present embodiment 1, the total luminous flux value in the large electric current region exhibited a high value in comparison to the conventional product.

As is apparent from the measurement results shown in FIG. 6, the reason that embodiment 1 exhibited a high total luminous flux value in the high electric current region is because the specific surface area increased, the ultra violet ray intensity per unit area of the fluorescent screen dropped, and the luminance saturation of the fluorescent substance was improved because the uneven surface UNE was formed in the fluorescent substance film FLU.

It will be noted that, in regard to the uneven portions UNE in the fluorescent substance film FLU that was formed on the inner wall surface of the glass tube VAL, the reason that the film thickness T1 of the concave portions CC was made about 18 μm and the film thickness T2 of the convex portions CV was made about 27 μm such that the film thickness difference thereof was made equal to or greater than 9 μm is because the film thickness of existing fluorescent substance films is formed in a dimension of about 18 μm to 22 μm, so the difference between the convex portions CV, which have a thickness of about 1.5 times (about 27 μm) about 18 μm which is the film thickness of the concave portions CC that are the thinnest portions, and the concave portions CC, whose film thickness is about 18 μm, is about 9 μm.

Here, when the height of the convex portions CV is low, effects are low, and effects are obtained as the height of the convex portions CV becomes higher, but film formation becomes difficult in accompaniment with this. For this reason, convex portions CV that are somewhat higher than about 1.5 times an ordinary film thickness become realistic. When the difference between the concave portions CC and the convex portions CV is about 1.5 times, the excitation intensity of the fluorescent substance becomes saturated to $1/\sqrt{2}$ by simple calculation.

It will be noted that, in the preceding embodiment 1, a case has been described where the uneven portions UNE that were formed in the surface of the fluorescent substance film FLU were given an a periodic shape along the circumferential direction of the inner wall surface of the glass tube VAL, but the present invention is not limited to this shape, and it goes without saying that the same action and effects are obtained even when the uneven portions UNE have a periodic shape along the circumferential direction of the inner wall surface of the glass tube VAL. Further, of course the same action and effects are obtained even when the uneven portions UNE have a periodic or a periodic shape along the tube axis direction of the inner wall surface of the glass tube VAL.

Embodiment 2

Figure 7:
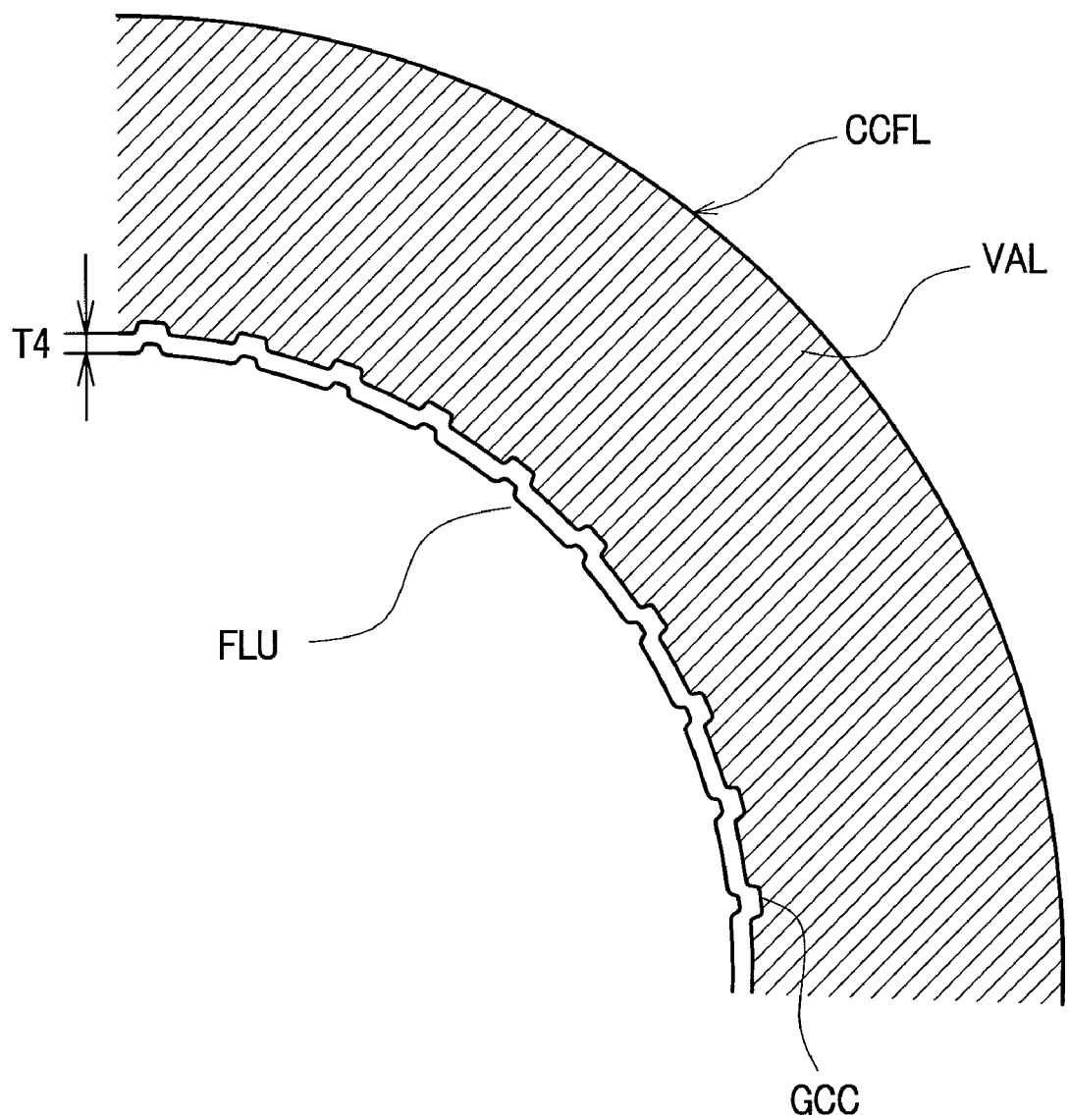
FIG. 7 is an enlarged cross-sectional diagram of relevant portions showing a configural example of embodiment 2 of a cold cathode fluorescent lamp that is packaged in the liquid crystal display device according to the present invention.

FIG. 7 is an enlarged cross-sectional diagram of relevant portions cut in a plane perpendicular to a tube axis showing the configuration of embodiment 2 of the cold cathode fluorescent lamp that is packaged in the liquid crystal display device according to the present invention. The same reference numerals will be given to the same portions as those in the aforementioned drawings, and description thereof will be omitted. In FIG. 7, what is different from FIG. 4 is that, in this cold cathode fluorescent lamp CCFL, plural straight concave portions GCC are formed at intervals of about 20 μm in parallel along a tube axis direction in an inner wall surface of a transparent glass tube VAL and that a fluorescent substance film FLU that comprises a rare earth fluorescent substance in which there are concave portions that conform to the shapes of the concave portions GCC is adhered to and formed on the inner wall surface of the glass tube VAL in which these concave portions GCC are formed.

In this cold cathode fluorescent lamp CCFL, a resist layer with a width of about 20 μm is formed at intervals of about 20 μm straightly in a direction parallel to the glass tube axis on the inner wall surface of the transparent glass tube VAL that comprises borosilicate glass with an inner diameter of about 2.0 mm and an outer diameter of about 3.0 mm. Thereafter, hydrofluoric acid is injected into the inside of this glass tube VAL, and the portion of the glass inner wall surface where there is no resist layer is melted to a depth of about 10 μm to form the concave portions GCC in the inner wall surface. Next, the glass tube VAL is cleaned and dried, thereafter the resist layer is removed, the glass tube VAL is again cleaned and dried, and the glass tube VAL in whose inner wall surface the concave portions GCC are formed is obtained.

Next, a fluorescent substance suspension whose main components are a rare earth fluorescent substance with a particle diameter of about 5 μm, for example, a vehicle, a diluent and a binder is applied by, for example, suction to the glass tube VAL in whose inner peripheral surface the concave portions GCC have been formed, is formed, and is thereafter dried. Thus, the fluorescent substance film FLU in which are formed concave portions that conform to the shapes of the concave portions GCC in the inner wall surface of the glass tube VAL that is the foundation is formed. A film thickness T4 of this fluorescent substance film FLU was formed so as to become equal to or greater than about 18 μm.

Figure 8:
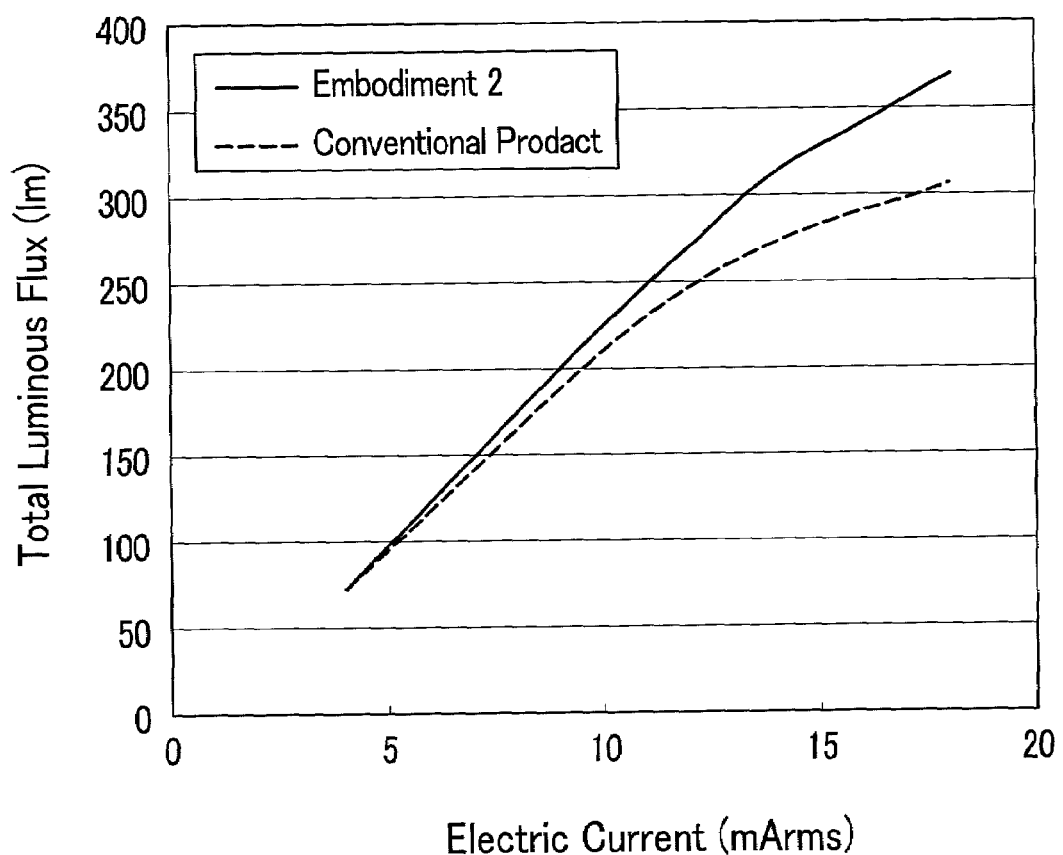
FIG. 8 is a diagram showing electric current dependences of total luminous fluxes of the cold cathode fluorescent lamp of embodiment 2 and the conventional cold cathode fluorescent lamp.

The glass tube VAL on which the fluorescent substance film FLU was formed in this manner was cut as shown in FIG. 7, and the fluorescent substance film FLU that was formed on the inner wall surface of the glass tube VAL was observed with a microscope. As a result, the film thickness difference between the most convex portions and concave portions was about 9 μm. Next, the total luminous fluxes of these cold cathode fluorescent lamps were measured using an integrating sphere. Those measurement results are shown in FIG. 8. In the present embodiment 2 also, the total luminous flux value in the large electric current region exhibited a high value in comparison to the conventional product. From these results, it became apparent that the cold cathode fluorescent lamp CCFL according to embodiment 2 is extremely effective in increasing the luminous flux amount.

It will be noted that, in regard to the concave portions GCC that were formed in the inner wall surface of the glass tube VAL, the reason that the difference between the convex portions and the concave portions was made equal to or greater than about 10 μm is because effects are obtained when the difference between the convex portions and the concave portions becomes larger and the pitch becomes smaller. On the other hand, the intensity of the glass tube VAL drops in accompaniment with the depth of the concave portions becoming deeper. In a thin glass tube VAL, the thickness is about 200 μm. Consequently, effects are obtained, and the difference between the concave portions and the convex portions is made about 10 μm as a value that does not impart great damage to the mechanical strength of the glass tube VAL.

It will be noted that, in the preceding embodiment 2, a case has been described where the concave portions GCC that were formed in the inner wall surface of the glass tube VAL were given a periodic shape along the tube axis direction of the glass tube VAL, but the present invention is not limited to this shape, and it goes without saying that the same action and effects as mentioned previously are obtained in regard also to a case where the concave portions GCC are given an a periodic shape along the circumferential direction of the glass tube VAL.

Further, in the aforementioned embodiment 1 and embodiment 2, cases have been described where the uneven portions UNE that were formed in the surface of the fluorescent substance film FLU and the concave portions GCC that were formed in the inner wall surface of the glass tube VAL were given periodic or a periodic shapes along the circumferential direction or the tube axis direction of the glass tube VAL, but the present invention is not limited to these shapes. Of course, the same action and effects are obtained even with various types of uneven shapes such as stripe shapes including also diagonal directions, dimple shapes or slender wave shapes, or a periodic shapes such as ring shapes that are formed by a method where the fluorescent substance suspension is divided two times and applied.

What is claimed is:

1. A liquid crystal display device comprising:
   a liquid crystal display panel;
   a backlight that irradiates the liquid crystal display panel with illuminating light;
   an optical sheet that is disposed between the liquid crystal display panel and the backlight; and
   a frame that houses the liquid crystal display panel and the backlight,
   wherein
   the backlight includes a cold cathode fluorescent lamp,
   the cold cathode fluorescent lamp includes
   a transparent glass tube inside of which a noble gas and mercury are enclosed,
   a pair of opposing cold cathodes that are enclosed and disposed in both end portions of the glass tube,
   a pair of electrical power lead-in wires, one end of each of which is connected to the cold cathodes and the other end of each of which is hermetically sealed outside the glass tube and is led outside the glass tube,
   a fluorescent substance film that is formed on an inner wall surface of the glass tube,
   the fluorescent substance film includes uneven portions in a film surface thereof, and
   the uneven portions in the film surface of the fluorescent substance film include a concave portion and convex portion which are continuous and which extend along at least one of a circumferential direction and a tube axis direction of the inner wall surface of the glass tube.

2. A liquid crystal display device according to claim 1, wherein the uneven portions in the fluorescent substance film are the concave portions and convex portions which do not result from the shape of fluorescent substance particles and particle diameter differences between the fluorescent substance particles.

3. A liquid crystal display device according to claim 1, wherein the uneven portions in the fluorescent substance film are formed periodically or aperiodically along the circumferential direction of the inner wall surface of the glass tube.

4. A liquid crystal display device according to claim 1, wherein the uneven portions in the fluorescent substance film are formed periodically or aperiodically along the tube axis direction of the inner wall surface of the glass tube.

5. A liquid crystal display device according to claim 1, wherein a film thickness of the convex portions in the fluorescent substance film is equal to or greater than 1.5 times a film thickness of the concave portions in the fluorescent substance film.

6. A liquid crystal display device comprising:
   a liquid crystal display panel;
   a backlight that irradiates the liquid crystal display panel with illuminating light;
   an optical sheet that is disposed between the liquid crystal display panel and the backlight; and
   a frame that houses the liquid crystal display panel and the backlight,
   wherein
   the backlight includes a cold cathode fluorescent lamp,
   the cold cathode fluorescent lamp includes
   a transparent glass tube inside of which a noble gas and mercury are enclosed,
   a pair of opposing cold cathodes that are enclosed and disposed in both end portions of the glass tube,
   a pair of electrical power lead-in wires, one end of each of which is connected to the cold cathodes and the other end of each of which is hermetically sealed outside the glass tube and is led outside the glass tube,
   a fluorescent substance film that is formed on an inner wall surface of the glass tube,
   the glass tube includes uneven portions in the inner wall surface thereof,
   the fluorescent substance film that is formed on the uneven portions includes periodic or aperiodic uneven portions resulting from the uneven portions in the inner wall surface of the glass tube, and
   the uneven portions of at least one of the inner wall surface of the glass tube and a film surface of the fluorescent substance film include a concave portion and convex portion which are continuous and which extend along at least one of a circumferential direction and a tube axis direction of the inner wall surface of the glass tube.

7. A liquid crystal display device according to claim 6, wherein the uneven portions in the inner wall surface of the glass tube are formed along the circumferential direction of the glass tube.

8. A liquid crystal display device according to claim 6, wherein the uneven portions in the inner wall surface of the glass tube are formed along the tube axis direction of the glass tube.

9. A liquid crystal display device according to claim 6, wherein a film thickness difference of the fluorescent substance film between the convex portions and the concave portions thereof is equal to or greater than 9 μm.

10. A liquid crystal display device according to claim 6, wherein a difference between the convex portions and the concave portions in the inner wall surface of the glass tube is equal to or greater than 10 μm.

11. A liquid crystal display device according to claim 6, wherein the uneven portions in the fluorescent substance film are the concave portions and convex portions which do not result from a shape of fluorescent substance particles of the fluorescent substance film and particle diameter differences between the fluorescent substance particles.

* * * * *